(12) United States Patent
Clark et al.

(10) Patent No.: US 9,567,872 B2
(45) Date of Patent: Feb. 14, 2017

(54) METHOD OF SUPPORTING A TOOL AND AN APPARATUS FOR SUPPORTING A TOOL IN AN ASSEMBLED APPARATUS

(71) Applicant: ROLLS-ROYCE PLC, London (GB)

(72) Inventors: Daniel Clark, Belper (GB); Justin Burrows, Ilkeston (GB); James Kell, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/727,298

(22) Filed: Jun. 1, 2015

(65) Prior Publication Data

US 2015/0267564 A1 Sep. 24, 2015

Related U.S. Application Data

(62) Division of application No. 13/454,336, filed on Apr. 24, 2012, now Pat. No. 9,073,156.

(30) Foreign Application Priority Data

May 9, 2011 (GB) .................................. 1107634.6

(51) Int. Cl.
*F01D 5/00* (2006.01)
*F01D 25/28* (2006.01)
(Continued)

(52) U.S. Cl.
CPC ............ *F01D 25/285* (2013.01); *B23Q 9/0042* (2013.01); *B23Q 17/2409* (2013.01); *F01D 5/005* (2013.01);
(Continued)

(58) Field of Classification Search
CPC ... G02B 23/2476; G02B 23/24; G01B 5/0002; G01N 21/954; G01N 2021/9542; G01N 2021/9544; G01N 2021/9546; G01N 2021/9548; F01D 5/005
See application file for complete search history.

(56) References Cited

U.S. PATENT DOCUMENTS 3,329,059 A * 7/1967 McCormac ............... F02K 9/24
356/241.1
4,830,491 A * 5/1989 Grace ......................... 356/241.1
(Continued)

FOREIGN PATENT DOCUMENTS

DE 41 03 758 A1 8/1992
EP 0 907 077 A2 4/1999
(Continued)

OTHER PUBLICATIONS

Komaroff; "Anthroscopic Surgery;" Harvard Medical School Family Health Guide; Sep. 1999; pp. 63.
(Continued)

*Primary Examiner* — Sarang Afzali
*Assistant Examiner* — Ruth G Hidalgo-Hernandez
(74) *Attorney, Agent, or Firm* — Oliff PLC (57) ABSTRACT

An apparatus for supporting a tool in an assembled apparatus. The apparatus includes a support structure, the support structure having a central member and a plurality of support members pivotally mounted on the central member. The support members are movable between a non-deployed position in which the support members extend a minimum distance from the central member and a deployed position in which the support members extend a maximum distance from the central member.

10 Claims, 5 Drawing Sheets

(51) Int. Cl.
*F01D 21/00* (2006.01)
*G02B 23/24* (2006.01)
*B23Q 9/00* (2006.01)
*B23Q 17/24* (2006.01)
*F01D 9/06* (2006.01)
*F16L 3/01* (2006.01)
*F16M 13/02* (2006.01)

(52) U.S. Cl.
CPC ............ *F01D 9/065* (2013.01); *F01D 21/003* (2013.01); *F16L 3/01* (2013.01); *F16M 13/022* (2013.01); *G02B 23/2476* (2013.01); *Y10T 29/49318* (2015.01); *Y10T 29/49826* (2015.01)

(56) References Cited

U.S. PATENT DOCUMENTS

| | | | |
|---|---|---|---|
| 5,155,941 A | | 10/1992 | Takahashi et al. |
| 5,565,981 A | * | 10/1996 | Winstead et al. .......... 356/241.1 |
| 5,794,398 A | | 8/1998 | Kaehler et al. |
| 6,699,279 B2 | | 3/2004 | Stevens et al. |
| 7,785,250 B2 | | 8/2010 | Nakao |
| 2005/0199832 A1 | | 9/2005 | Twerdochlib |
| 2006/0081701 A1 | | 4/2006 | Pang et al. |
| 2007/0132840 A1 | | 6/2007 | Konomura |
| 2008/0275554 A1 | | 11/2008 | Iannarone et al. |
| 2009/0001059 A1 | | 1/2009 | Spallek et al. |

FOREIGN PATENT DOCUMENTS

| | | |
|---|---|---|
| EP | 1 811 136 A2 | 7/2007 |
| EP | 1 975 271 A2 | 10/2008 |
| EP | 2 119 875 A2 | 11/2009 |
| GB | 1 296 534 A | 11/1972 |
| GB | 2 033 973 A | 5/1980 |
| JP | S56-135820 A | 10/1987 |
| JP | 2000-292108 A | 10/2000 |
| JP | 2009-282274 A | 12/2009 |
| WO | 2006/117519 A1 | 11/2006 |
| WO | 2007/134461 A1 | 11/2007 |

OTHER PUBLICATIONS

Nov. 26, 2013 Search Report issued in British Patent Application No. 1312357.5.

Sep. 7, 2011 Search Report issued in British Patent Application No. 1107634.6.

* cited by examiner

METHOD OF SUPPORTING A TOOL AND AN APPARATUS FOR SUPPORTING A TOOL IN AN ASSEMBLED APPARATUS

This application is a Divisional Application of U.S. patent application Ser. No. 13/454,336, filed on Apr. 24, 2012, which claims priority to GB 1107634.6, filed on May 9, 2011. The disclosures of each of the above applications are herein incorporated by reference in their entireties.

The present invention relates to a method and an apparatus for supporting a tool in an assembled apparatus and the present invention relates in particular to a method and an apparatus for supporting a tool for inspecting and/or processing a component in an assembled apparatus. The present invention relates in particular to a method and an apparatus for supporting a tool in an assembled gas turbine engine and the present invention relates in particular to a method and an apparatus for supporting a tool for inspecting and/or processing a component in an assembled gas turbine engine.

GB1296534 discloses a fastening device positioned at an end of a boroscope to attach the boroscope to an adjacent structure. The fastening device comprises an expandable structure to attach the boroscope to the adjacent structure and in particular the fastening device comprises an inflatable flexible rubber bag and the flexible rubber bag is inflated by a fluid such that it engages two adjacent turbine blades within a gas turbine engine and the boroscope is used to view turbine vanes within the gas turbine engine.

Accordingly the present invention seeks to provide a novel method and an apparatus for supporting a tool in an assembled apparatus.

Accordingly the present invention provides a method of supporting a tool in an assembled apparatus, the method comprising the steps of (a) inserting a support structure through a first aperture in a casing of the apparatus, a first end of the support structure being outside the casing and a second end of the support structure being inside the casing, (b) securing the first end of the support structure to the casing, (c) arranging a first portion of the support structure to abut at least one surface within the casing, (d) inserting a tool through the first aperture or a second aperture in the casing, and (e) securing the tool to a second portion of the support structure within the casing.

Step (d) may comprise inserting a boroscope, a conduit for a fluid and/or a light source through the first aperture or the second aperture in the casing.

Step (d) may comprise inserting at least one of a boroscope, a conduit for fluid, a conduit for a material, a light source, a grinder, a cutter, a laser, a welding torch or a spray deposition gun through the first aperture or a second aperture in the casing.

Step (d) may comprise inserting a first tool through the second aperture and a second tool through a third aperture in the casing.

Step (d) may comprise inserting a third tool through a fourth aperture in the casing.

Step (d) may comprise inserting a boroscope through the second aperture, inserting a machine tool through a third aperture and inserting a light source through a fourth aperture in the casing.

Step (d) may comprise inserting a boroscope through the second aperture, inserting a conduit through a third aperture and inserting a light source through a fourth aperture in the casing.

Step (d) may comprise inserting a boroscope and a conduit through the second aperture in the casing.

Step (c) may comprise arranging the first portion of the support structure to abut an inner surface of the casing such that the support structure clamps onto the casing.

The support structure may comprise a central member and a plurality of support members pivotally mounted on the central member, the support members are movable from a non-deployed position in which the support members extend a minimum distance from the central member and a deployed position in which the support members extend a maximum distance from the central member.

Step (a) may comprise inserting the support structure with the support members arranged substantially parallel to the central member and step (c) comprises pivoting the support members relative to the central member such that the support members abut the inner surface of the casing and such that the support structure clamps onto the casing.

Step (a) may comprise inserting the support structure with the support members arranged substantially parallel to the central member such that the second end of the support structure abuts a first surface within the casing and step (c) comprises pivoting the support members relative to the central member such that the plurality of support members abut a plurality of surfaces within the casing.

The support members may be movable between a non-deployed position in which the support members are substantially parallel to the central member and deployed position in which the support members are not parallel to the central member.

The support members may comprise cams eccentrically pivotally mounted on the central member.

The casing may be a casing of a gas turbine engine. The second end of the support structure may abut an inner platform of a stator vane or an outer surface of a rotor and the plurality of support members may abut a convex surface of a first stator vane and a concave surface of a second stator vane.

Step (e) may comprise providing a magnet on the tool, providing a magnet at the second portion of the support structure and securing the magnet on the tool to the magnet at the second portion of the support structure.

The method may comprise inserting the support structure through the aperture in the casing in a non-deployed position and then deploying the support structure such that the first portion of the support structure abuts at least one surface within the casing.

The central member may be arranged coaxial or parallel with the axis of the first aperture in the casing.

The method may comprise providing a plurality of support structures, inserting each support structure through a respective aperture in the casing, securing a first tool to a first support structure, securing a second tool to a second support structure, securing a third tool to a third support structure and securing a fourth tool to a fourth support structure.

The method may comprise providing a plurality of support structures, inserting each support structure through a respective set of apertures in the outer compressor casing and the inner compressor casing, securing a first tool to a first support structure, securing a second tool to a second support structure, securing a third tool to a third support structure and securing a fourth tool to a fourth support structure.

The method may comprise providing a plurality of support structures, inserting each support structure through a respective aperture in the casing, securing a portion of at least one support structure to a portion of at least one other support structure within the casing. The method may comprise securing a portion of each support structure to a portion of at least one other support structure within the casing. The method may comprise securing a portion of each support structure to a portion of two other support structures within the casing such that the support structures form a stiff ring within the casing. The method may comprise inserting each support structure through a respective aperture located around a boss in the casing, securing a portion of each support structure to a portion of two other support structures within the casing such that the support structures form a stiff ring within the casing.

The tool may comprise a boroscope and the method further comprising step (f) viewing a component within the assembled apparatus.

The tool may comprise a conduit for fluid and the method further comprising step (g) supplying fluid through the conduit to clean a component within the assembled apparatus.

The tool may comprise a conduit for fluid and the method further comprising step (h) supplying a dye penetrant through the conduit to a component within the assembled apparatus to detect a defect in the component. Step (h) may follow step (g) or step (g) may follow step (h).

The tool may comprise a grinder, a cutter, a laser and the method comprising step (i) removing material from a component within the assembled apparatus. Step (i) may follow step (h) to remove a damaged portion of the component.

The tool may comprise a laser or a welding torch and the method comprising step (j) depositing material onto a component within the assembled apparatus. Step (j) may follow step (i). Step (i) may follow step (j) to remove excess material deposited by step (j).

The tool may comprise a spray deposition gun and the method comprising step (k) depositing a coating onto a component within the assembled apparatus. Step (k) may follow step (j).

The present invention also provides an apparatus for supporting a tool in an assembled apparatus, the apparatus comprising a support structure, the support structure comprises a central member and a plurality of support members pivotally mounted on the central member, the support members are movable a non-deployed position in which the support members extend a minimum distance from the central member and a deployed position in which the support members extend a maximum distance from the central member.

The support members may be movable between a non-deployed position in which the support members are substantially parallel to the central member and deployed position in which the support members are not parallel to the central member.

The support members may be cams eccentrically pivotally mounted on the central member.

The central member may be arranged coaxial or parallel with a central axis of the support structure.

The tool may comprise at least one of a boroscope, a conduit for fluid, a conduit for a material, a light source, a grinder, a cutter, a laser, a welding torch or a spray deposition gun.

The present invention also provides a method of inspecting and/or repairing a component in an assembled apparatus, the method comprising the steps of (a) inserting a support structure through a first aperture in a casing of the apparatus, a first end of the support structure being outside the casing and a second end of the support structure being inside the casing, (b) securing the first end of the support structure to the casing, (c) arranging a first portion of the support structure to abut at least one surface within the casing, (d) inserting a tool through the first aperture or a second aperture in the casing, and (e) securing the tool to a second portion of the support structure within the casing.

The present invention will be more fully described by way of example with reference to the accompanying drawings in which.

Figure 1:
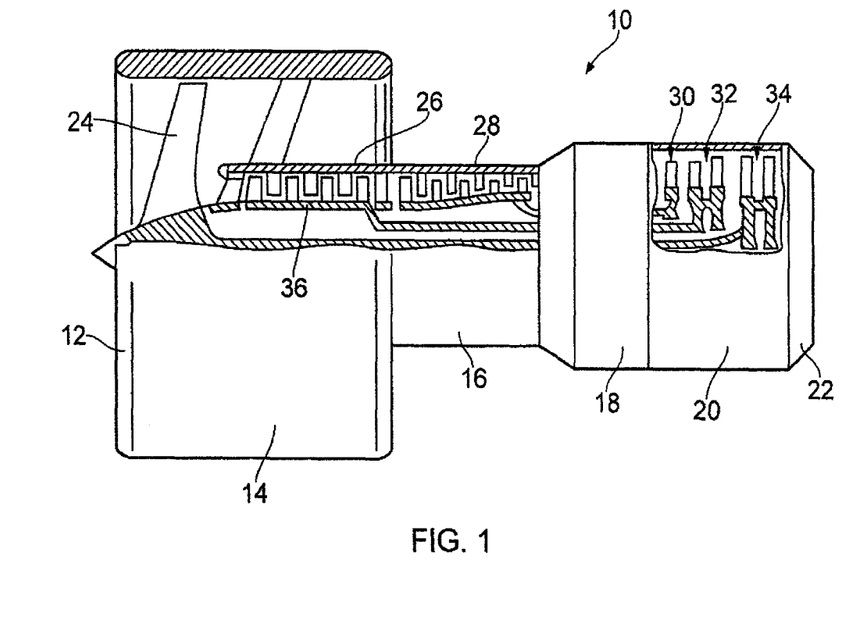
FIG. 1 shows a turbofan gas turbine engine having a component inspected and/or repaired using a method according to the present invention.

A turbofan gas turbine engine 10, as shown in FIG. 1, comprises an inlet 12, a fan section 14, a compressor section 16, a combustion section 18, a turbine section 20 and an exhaust 22. The fan section 14 comprises a fan 24. The compressor section 16 comprises an intermediate pressure compressor 26 and a high pressure compressor 28 arranged in flow series. The turbine section 20 comprises a high pressure turbine 30, an intermediate pressure turbine 32 and a low pressure turbine 34 arranged in flow series. The low pressure turbine 34 is arranged to drive the fan 24, the intermediate pressure turbine 32 is arranged to drive the intermediate pressure compressor 26 and the high pressure turbine 30 is arranged to drive the high pressure compressor 28.

Figure 2:
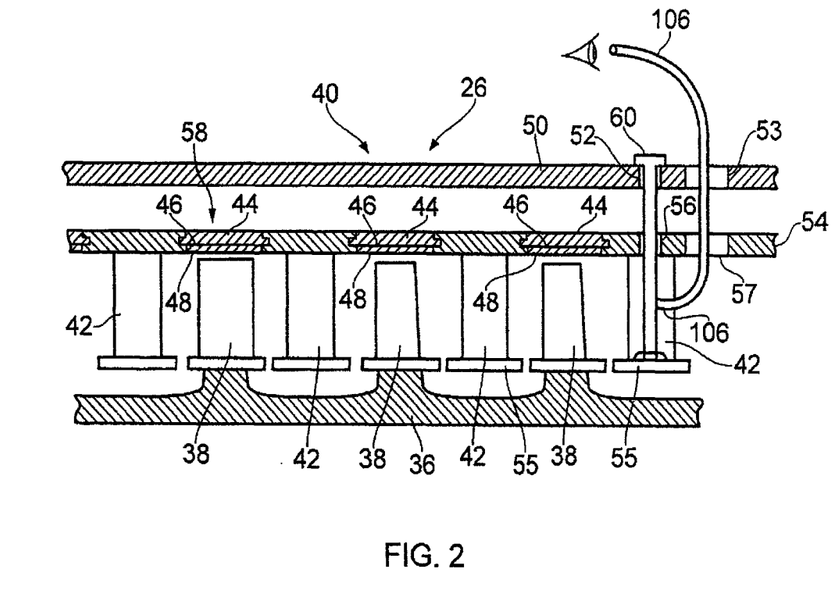
FIG. 2 is an enlarged cross-sectional view through a compressor of the turbofan gas turbine engine having a compressor stator component being inspected and/or repaired using a method according to the present invention.

The intermediate pressure compressor 26, as shown more clearly in FIG. 2, comprises a rotor 36 carrying a plurality of stages of compressor rotor blades 38 and a stator 40 carrying a plurality of stages of compressor stator vanes 42. The compressor rotor blades 38 in each stage are circumferentially spaced and extend generally radially outwardly from the rotor 36. The compressor stator vanes 42 in each stage are circumferentially spaced and extend generally radially inwardly from the stator 40. The stator 40 also comprises a plurality of shrouds 44 axially interconnecting the stages of compressor stator vanes 42 and the shrouds 44 are positioned radially around a corresponding one of the stages of compressor rotor blades 38. The stator 40 of the intermediate pressure compressor 26 also comprises an outer compressor casing 50 and the outer compressor casing 50 is provided with one or more apertures 52, 53 to allow access for boroscopes. In addition the radially outer platforms 54 of one or more of the compressor stator vanes 42 have one or more apertures 56, 57 to allow access for boroscopes and/or repair devices. The shrouds 44 axially interconnecting the stages of compressor stator vanes 42 form a portion of an inner compressor casing 58. The compressor stator vanes 42 also have radially inner platforms 55.

The present invention provides a method for supporting a tool, for example for inspecting and/or repairing a component, in an assembled apparatus, in this particular example a component in an assembled gas turbine engine 10, as shown in FIGS. 3 to 6. In the method a support structure 60 is inserted through the aperture 52 in the outer compressor casing 50 of the intermediate pressure compressor 26 of the gas turbine engine 10. The support structure 60 is also inserted through the aperture 56 in the radially outer platform 54 of one of the compressor stator vanes 42 of the inner compressor casing 58 of the intermediate pressure compressor 26 of the gas turbine engine 10. A first end 62 of the support structure 60 is positioned outside the outer compressor casing 50. The support structure 60 extends through the aperture 52 in the outer compressor casing 50, through the space between the outer compressor casing 50 and the inner compressor casing 58 and through the aperture 56 in the radially outer platform 54 of the inner compressor casing 58. A second end 64 of the support structure 60 is inside the outer compressor casing 50 and is also inside the inner compressor casing 58.

Figures 3, 4, 5, 6, 7:
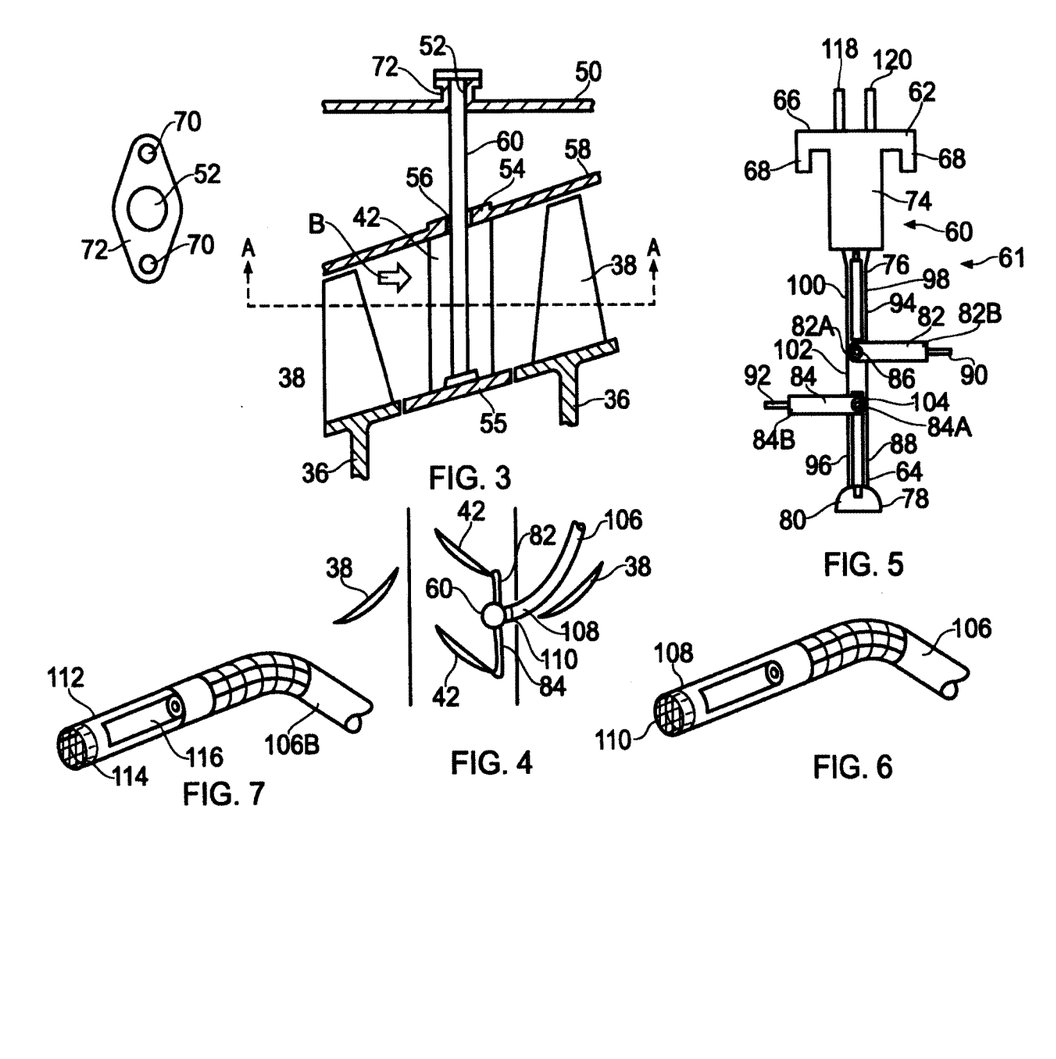
FIG. 3 shows a further enlarged cross-sectional view through a portion of the compressor of the turbofan gas turbine engine showing a support structure according to the present invention in position.
FIG. 4 is a view in the direction of arrow A in FIG. 3 showing support members in a deployed position.
FIG. 5 is a view in the direction of arrow B in FIG. 3 showing support members in a deployed position.
FIG. 6 is a perspective view of an end of a boroscope to be supported by the support structure according to the present invention.
FIG. 7 is a perspective view of an end of a combined boroscope and machine tool to be supported by the support structure according to the present invention.

The first end 62 of the support structure 60 is secured to the outer compressor casing 50. In this example the first end 62 of the support structure 60 comprises a flange 66 and the flange 66 has one or more projections 68 which extend from the flange 66 and locate in threaded blind apertures 70 located around the aperture 52 in the outer compressor casing 50 as shown in FIGS. 3 and 5. Alternatively the flange 66 may have apertures and bolts may be inserted through the apertures in the flange 66 and threaded into the threaded blind apertures 70. The aperture 52 and the blind apertures 70 may be arranged in a boss 72 on the outer compressor casing 50. The threaded blind apertures 70 are provided to receive bolts in order to secure a sealing plate over the aperture 52 for normal operation of the turbofan gas turbine engine 10.

The support structure 60, as shown in FIGS. 3 and 5 comprises a housing 74 from which the flange 66 extends and at least one telescopic member 76 which is extendable into and out of the housing 74. The housing 74 and the at least one telescopic member 76 define a central member. The telescopic member 76 is extended out of the housing 74, in a radially inward direction, such that a first portion 78, at the radially inner end, of the telescopic member 76 of the support structure 60 abuts one or more radially inner platforms 55 of the stator vanes 42. The first portion 78 of the support structure 60 abuts at least one surface, a surface of the radially inner platform 55 of a stator vane 42, within both the outer compressor casing 50 and the inner compressor casing 58. The at least one telescopic member 76 comprises a rubber, or elastomeric, member 80 at the first portion 78 of the support structure 60.

The at least one telescopic member 76 comprises first and second support members 82 and 84 and the first and second support members 82 and 84 are pivotally mounted at respective first ends 82A and 84A on the telescopic member 76 by hinges 86 and 88 respectively. The hinges 86 and 88 are arranged transverse, e.g. perpendicular, to the telescopic member 76 and in use are generally arranged in a direction parallel to the axis of the turbofan gas turbine engine 10 when installed. The second ends 82B and 84B of the support member 82 and 84 have grips, or tensioners, 90 and 92 respectively. The first ends 82A and 84A of the first and second support members 82 and 84 are longitudinally spaced along the telescopic member 76 and the axis of rotation of the hinges 86 and 88 are parallel. The first and second support members 82 and 84 are movable, pivotable, between a non-deployed position during insertion of the support structure 60 through the apertures 52 and 56 in the outer compressor casing 50 and inner compressor casing 58 and a deployed position when the support structure 60 is fully inserted. In the non-deployed position the first and second support members 82 and 84 are located within the telescopic member 76 with the second ends 82B and 84B remote from each other with the first ends 82A and 84A between the second ends 82B and 84B of the first and second support members 82 and 84 respectively. In the deployed position, as shown in FIGS. 4 and 5, the first and second support members 82 and 84 have pivoted through about 90° through slots 94 and 96 respectively in oppositely facing surfaces 98 and 100 respectively of the telescopic member 76 such that the second ends 82B and 84B abut two adjacent stator vanes 42. The grips, or tensioners, 90 and 92 of the first and second support member 82 and 84 respectively may be arranged to contact the leading edges, the trailing edges or the pressure, concave, and suction, convex, surfaces of the adjacent stator vanes 42, as shown in FIG. 4. The first support member 82 pivots from a radial orientation to a tangential orientation and the second support member 84 pivots from a radial orientation to a tangential orientation. In this example the support member 82 pivots downwardly from the non-deployed position, a radial orientation, to the deployed position, a horizontal orientation, and the second support member 84 pivots upwardly from the non-deployed position, a radial orientation, to the deployed position, a horizontal orientation. A magnetic member 104 is located longitudinally at a second position 102 between the first ends 82A and 84A of the first support members 82 and 84 respectively.

A boroscope 106 is inserted through a second set of apertures 53, 57 in the outer compressor casing 50 and inner compressor casing 58 and the boroscope 106 is secured to the magnetic member 104 at the second portion 102 of the support structure 60 within the inner compressor casing 58. A free end 108 of the boroscope 106 is provided with a magnetic member 110 which secures the boroscope 106 to the magnetic member 104 at the second position 102 of the support structure 60, as shown in FIG. 6. Alternatively a combined boroscope and machine tool 106B is inserted through a second set of apertures 53, 57 in the outer compressor casing 50 and inner compressor casing 58 and the combined boroscope and machine tool 106B is secured to the magnetic member 104 at the second portion 102 of the support structure 60 within the inner compressor casing 58. A free end 112 of the combined boroscope and machine tool 110 is provided with a magnetic member 114 which secures the combined boroscope and machine tool 110 to the magnetic member 104 at the second position 102 of the support structure 60, as shown in FIG. 7. The combined boroscope and machine tool 110 comprises a cavity 116 at the free end 112 and the machine tool is provided in the cavity 116. The machine tool may be a grinder, a cutter, a laser etc. The machine tool may be used to perform any one or more of the following processes, remove material, peen, chip, plastically deform, clean, deposit material or reprofile a component. The cavity 116 may contain a nozzle, or device, to dispense fluids. The combined boroscope and machine tool 106B may comprise optical fibres arranged coaxially around and defining the cavity and the optical fibres may be arranged to direct light onto components and to view components.

The support structure 60 is provided with cables 118 and 120 which extend through the housing 74 and the telescopic member 76. The cable 118 is pulled to move the support members 82 and 84 between the non-deployed and deployed position and the cable 120 is pulled to operate the grips 90 and 92 such that they grip the adjacent stator vanes 38.

Although the support structure has been described with reference to at least one telescopic member it may be possible for the support structure to comprise a single member with a predetermined length to abut the radially inner platform of the stator vane of a particular stage of stator vanes. Different lengths of member may be used for different stages of stator vanes.

In the embodiments just described the support structure 60 comprises a central member 61 and a plurality of legs, support members 82 and 84, pivotally mounted on the central member 61. The central member 61 comprises the housing 54 and at least one telescopic member 76. The support structure 60 is inserted with the legs 82 and 84 arranged substantially parallel to the central member 61 such that the second end of the support structure 60 abuts a first surface within the casing. The legs 82 and 84 are pivoted relative to the central member 61 such that the legs 82 and 84 abut a plurality of surfaces within the casing. The support members 82 and 84 are movable from a non-deployed position in which the support members 82 and 84 extend a minimum distance from the central member 61 and a deployed position in which the support members 82 and 84 extend a maximum distance from the central member 61.

In the embodiments just described the support structure and the boroscope or combined boroscope and machine tool, tool, conduit for fluid or light source have magnetic members to secure the boroscope or combined boroscope and machine tool, tool, conduit for fluid, light source to the support structure. It may be possible to provide a member forming an eye, or aperture, or a hook on the support structure and to provide a hook or eye, or aperture, on the boroscope, combined boroscope and machine tool, tool, conduit for fluid or light source such that the hook locates in the eye, or aperture. It may be possible to provide an adhesive, a semi-adhesive, a UV curable and UV degradable adhesive, an electrostatic device, Velcro or a plug and socket on the support structure and/or boroscope, combined boroscope and machine tool, tool, conduit for fluid or light source.

In this embodiment the support structure is inserted through a first set of apertures in the outer compressor casing and the inner compressor casing, the boroscope is inserted through a second set of apertures, a tool is inserted through a third set of apertures and a light source is inserted through a fourth set of apertures. Alternatively the support structure is inserted through a first set of apertures in the outer compressor casing and the inner compressor casing, a boroscope is inserted through a second set of apertures, a conduit is inserted through a third set of apertures and a light source is inserted through a fourth set of apertures. Alternatively the support structure is inserted through a first set of apertures in the outer compressor casing and the inner compressor casing and a combined boroscope and machine tool and light source is inserted through a second set of apertures. Alternatively the support structure is inserted through a first set of apertures in the outer compressor casing and the inner compressor casing, a boroscope is inserted through a second set of apertures, a conduit is inserted through the second set of apertures and a light source is inserted through the second set of apertures and the boroscope, the conduit and the light source may be inserted through the second set of apertures sequentially or concurrently. Alternatively the support structure is inserted through a first set of apertures in the outer compressor casing and the inner compressor casing, a boroscope is inserted through a second set of apertures, a tool is inserted through the second set of apertures and a light source is inserted through the second set of apertures and the boroscope, the tool and the light source may be inserted through the second set of apertures sequentially or concurrently. It may be possible to use a plurality of the support structures, each of which is inserted through a respective set of apertures in the outer compressor casing and the inner compressor casing and secure a boroscope to one support structure, secure a machine tool to another support structure, secure a fluid supply to another support structure and secure a light source to another support structure.

Figure 8:
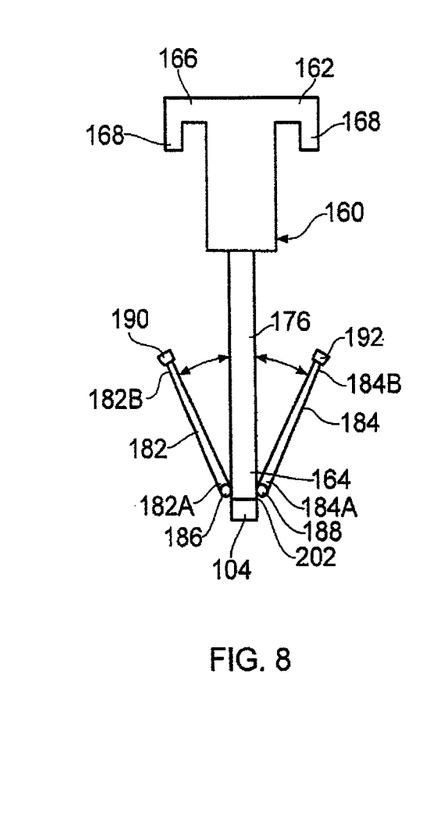
FIG. 8 is a view in the direction of arrow B in FIG. 3 showing an alternative support structure according to the present invention.

The present invention provides a further method for supporting a tool, for example for inspecting and/or repairing a component, in an assembled apparatus, in this particular example a component in an assembled gas turbine engine 10, as shown in FIG. 8. Again in this method a support structure 160 is inserted through the aperture 52 in the outer compressor casing 50 of the intermediate pressure compressor 26 of the gas turbine engine 10. The support structure 160 is also inserted through the aperture 56 in the radially outer platform 54 of one of the compressor stator vanes 42 of the inner compressor casing 58 of the intermediate pressure compressor 26 of the gas turbine engine 10. A first end 162 of the support structure 160 is positioned outside the outer compressor casing 50. The support structure 160 extends through the aperture 52 in the outer compressor casing 50, through the space between the outer compressor casing 50 and the inner compressor casing 58 and through the aperture 56 in the radially outer platform 54 of the inner compressor casing 58. A second end 164 of the support structure 160 is inside the outer compressor casing 50 and is also inside the inner compressor casing 58.

The first end 162 of the support structure 160 is secured to the outer compressor casing 50. In this example the outer end 162 of the support structure 160 comprises a flange 166 and the flange 166 has one or more projections 168 which extend from the flange 166 and locate in threaded blind apertures 70 located around the aperture 52 in the outer compressor casing 50. Alternatively the flange 166 may have apertures and bolts may be inserted through the apertures in the flange 166 and threaded into the threaded blind apertures 70. The aperture 52 and the blind apertures 70 may be arranged in a boss 72 on the outer compressor casing 50. The threaded blind apertures 70 are provided to receive bolts in order to secure a sealing plate over the aperture 52 for normal operation of the turbofan gas turbine engine 10.

The support structure 160 comprises a central member 176 and a plurality of support members, in this example first and second support members, 182 and 184 and the first and second support members 182 and 184 are pivotally mounted at respective first ends 182A and 184A on the central member 176 by hinges 186 and 188 respectively at the second end 164 of the support structure 160. The second ends 182B and 184B of the support member 182 and 184 have rubber, or elastomeric, members 190 and 192 respectively. The first and second support members 182 and 184 are movable, pivotable, between a non-deployed position during insertion of the support structure 160 through the apertures 52 and 56 in the outer compressor casing 50 and inner compressor casing 58 and a deployed position when the support structure 60 is fully inserted. In the non-deployed position the first and second support members 182 and 184 are located substantially adjacent to the central member 176. In the deployed position, the first and second support members 182 and 184 have pivoted through about 30° such that the rubber members 190 and 192 at the second ends 182B and 184B of the first and second support members 182 and 184 abut the inner surface of the inner compressor casing 58. The first and second support members 182 and 184 pivot from a radial, vertical, orientation to an orientation arranged at an angle to the radial direction. Thus, the support structure 160 clamps onto the outer compressor casing 50 at the first end 162 of the support structure 160 and the inner compressor casing 58 at the second ends 182B and 184B of the first and second support members 182 and 184. A magnetic member 104 is located longitudinally at a second position 202 at the second end 164 of the support structure 160. The support structure 160 is an umbrella like support structure. A free end 112 of the combined boroscope and machine tool 110 is provided with a magnetic member 114 which secures the combined boroscope and machine tool 110 to the magnetic member 104 at the second position 102 of the support structure 160. The support members 182 and 184 are movable from a non-deployed position in which the support members 182 and 184 extend a minimum distance from the central member 176 and a deployed position in which the support members 182 and 184 extend a maximum distance from the central member 176.

It may be possible to provide a member forming an eye, or aperture, or a hook on the support structure and to provide a hook or eye, or aperture, on the boroscope, combined boroscope and machine tool, tool, conduit for fluid or light source such that the hook locates in the eye, or aperture. It may be possible to provide an adhesive on the support structure and/or boroscope, combined boroscope and machine tool, tool, conduit for fluid or light source. The magnetic material, hook, eye, adhesive etc need not be provided at the second end, but may be spaced from the second end of the support structure.

A further alternative in this embodiment is to dispense with the magnetic member, hook or eye on the support structure and to provide a passage through the central member 176 through which a boroscope, a combined boroscope and machine tool, a conduit for a fluid, a light source etc is passed.

In the embodiments just described the support structure 160 comprises a central member 176, and a plurality of legs, support members 182 and 184, pivotally mounted on the central member 176. The support structure 160 is inserted with the legs 182 and 184 arranged substantially parallel to the central member 176. The legs 182 and 184 are pivoted relative to the central member 176 such that the legs 182 and 184 abut the inner surface of the casing and such that the support structure clamps onto the casing. A free end 112 of the combined boroscope and machine tool 110 is provided with a magnetic member 114 which secures the combined boroscope and machine tool 110 to the magnetic member 104 at the second position 102 of the support structure 260.

In this embodiment the support structure is inserted through a first set of apertures in the outer compressor casing and the inner compressor casing, the boroscope is inserted through a second set of apertures, a machine tool is inserted through a third set of apertures and a light source is inserted through a fourth set of apertures. Alternatively the support structure is inserted through a first set of apertures in the outer compressor casing and the inner compressor casing, a boroscope is inserted through a second set of apertures, a conduit is inserted through a third set of apertures and a light source is inserted through a fourth set of apertures. Alternatively the support structure is inserted through a first set of apertures in the outer compressor casing and the inner compressor casing and a combined boroscope and machine tool and light source is inserted through a second set of apertures. It may be possible to use a plurality of the support structures, each of which is inserted through a respective set of apertures in the outer compressor casing and the inner compressor casing and secure a boroscope to one support structure, secure a machine tool to another support structure, secure a fluid supply to another support structure and secure a light source to another support structure. The machine tool may be a cutter, a grinder, a laser head, a welding torch, a spray deposition gun etc.

Figure 9:
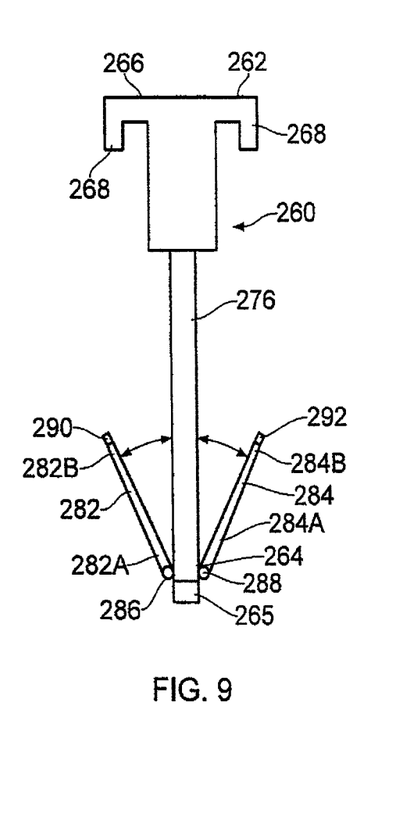
FIG. 9 is a view in the direction of arrow B in FIG. 3 showing another support structure according to the present invention in position.

The present invention provides a further method for supporting a tool, for example for inspecting and/or repairing a component, in an assembled apparatus, in this particular example a component in an assembled gas turbine engine 10, as shown in FIG. 9. The support structure 260 in FIG. 9 is similar to that in FIG. 8 and differs in that second end 264 of the support structure 260 has a rubber, or elastomeric, member 265 and a plurality of support members 282 and 284 are pivotally mounted at the second end 264 of the support structure 260. The rubber member 265 at the second end 264 of the central member 276 of the support structure 260 abuts one or more radially inner platforms 55 of the stator vanes 42. The rubber member 265 at the second end 264 of the central member 276 of the support structure 260 abuts at least one surface, a surface of the radially inner platform 55 of a stator vane 42, within both the outer compressor casing 50 and the inner compressor casing 58. The support structure 260 in the embodiments just described comprises a central member 276 and a plurality of legs, support members 282 and 284, pivotally mounted on the central member 276. The support structure 260 is inserted with the legs 282 and 284 arranged substantially parallel to the central member 276. The legs 282 and 284 are pivoted relative to the central member 276 such that the legs 282 and 284. The legs 282 and 284 may be arranged to abut the inner surface of the casing 58 and such that the support structure clamps onto the casing 58. A free end 112 of the combined boroscope and machine tool 110 is provided with a magnetic member 114 which secures the combined boroscope and machine tool 110 to the magnetic member 104 at the second position 102 of the support structure 260. The support members 282 and 284 are movable from a non-deployed position in which the support members 282 and 284 extend a minimum distance from the central member 276 and a deployed position in which the support members 282 and 284 extend a maximum distance from the central member 276.

Figure 10:
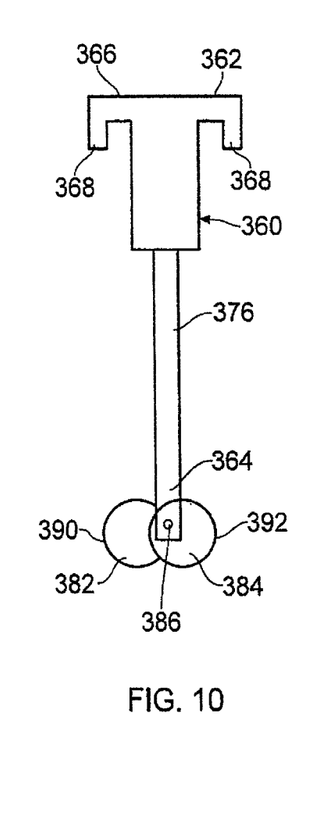
FIG. 10 is a view in the direction of arrow B in FIG. 3 showing an additional support structure according to the present invention in position.

The present invention provides a further method for supporting a tool, for example for inspecting and/or repairing a component, in an assembled apparatus, in this particular example a component in an assembled gas turbine engine 10, as shown in FIG. 10. The second end 364 of the support structure 360 has support members 382 and 384. The support members 382 and 384 are cams. The support members 382 and 384 are eccentrically pivotally mounted on a central member 376 of the support structure 360 by a hinge 386 and the support members 382 and 384 have camming surfaces 390 and 392 respectively which are moved further apart in the deployed position to abut surfaces, e.g. the pressure, concave, and suction, convex, surfaces of the adjacent stator vanes 42. The support members 382 and 384 are movable from a non-deployed position in which the support members 382 and 384 extend a minimum distance from the central member 376 and a deployed position in which the support members 382 and 384 extend a maximum distance from the central member 376. There may be two, three or four cams mounted upon a common pivot axis or may be mounted upon two adjacent parallel pivot axes. The camming surfaces 390 and 392 of the cams may be provided with rubber, or elastomeric, members or pads.

Figure 11:
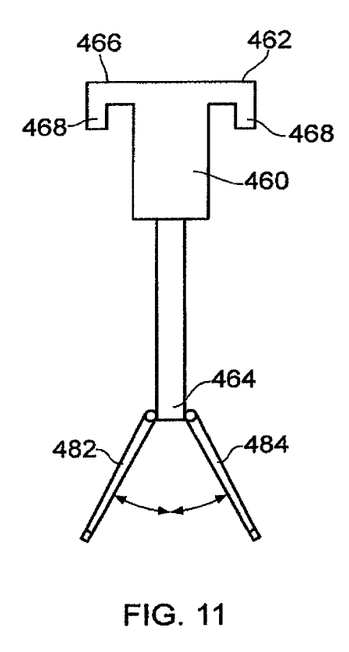
FIG. 11 is a view in the direction of arrow B in FIG. 3 showing an additional support structure according to the present invention in position.

The present invention provides a further method for supporting a tool, for example for inspecting and/or repairing a component, in an assembled apparatus, in this particular example a component in an assembled gas turbine engine 10, as shown in FIG. 11. The support structure 460 in FIG. 11 is similar to that in FIG. 8 and differs in that second end 464 of the support structure 460 has a plurality of support members 482 and 484 pivotally mounted at the second end 464 of the support structure 460. The support structure 460 is inserted with the legs 482 and 484 arranged substantially parallel to the central member 476 and such that the legs 482 and 484 extend away from the support structure 460. The legs 482 and 484 are pivoted relative to the central member 476 such that rubber, elastomeric, members at the second ends, or along the lengths, of the legs 482 and 484 abuts at least one surface, a surface of the radially inner platform 55 of a stator vane 42, within both the outer compressor casing 50 and the inner compressor casing 58.

A free end 112 of the combined boroscope and machine tool 110 is provided with a magnetic member 114 which secures the combined boroscope and machine tool 110 to the magnetic member 104 at the second position 102 of the support structure 460. The support members 482 and 484 are movable from a non-deployed position in which the support members 482 and 484 extend a minimum distance from the central member 476 and a deployed position in which the support members 482 and 484 extend a maximum distance from the central member 476.

It is to be noted that in each embodiment the support members are pivoted about an axis arranged transverse, substantially perpendicular, to the longitudinal direction of the central member. The central member may be coaxial with, parallel to or not parallel to the axis of the first set of apertures. The support members may be straight or curved. The support members may have the same or different lengths, the support members may move pivot by the same amount, angle, or different amounts, angles. The support structure may be used as a winch, or pulley, for a cable.

The casing may be a casing of a gas turbine engine. The casing may be a compressor casing, a combustor casing, a turbine casing, a bearing casing or a gearbox casing. The casing may comprise an outer casing and/or an inner casing. The second end of the support structure may abut an inner platform of a stator vane or an outer surface of a rotor and the plurality of support members may abut a convex surface of a first stator vane and a concave surface of a second stator vane.

The support structure in FIGS. 8 and 9 may be provided with a membrane extending between, secured to and sealed to adjacent support members, similar to an umbrella, and the membrane is arranged to form an enclosed chamber. The chamber may be evacuated or supplied with an inert gas, e.g. argon, nitrogen, to form a controlled atmosphere for repairing a component to prevent oxidation etc of the component, for example during welding, during brazing, during the deposition of material, metal or alloy, by direct laser deposition or welding deposition.

The present invention provides a support structure, e.g. a stable platform, for various devices, e.g. a boroscope to view components accurately, for a fluid supply to dispense a fluid accurately or for a machine tool to machine components accurately within an assembled apparatus, e.g. an internal combustion engine, a turbomachine, a gas turbine engine, a nuclear reactor, marine apparatus, petrochemical apparatus, a fluid pipe, a gas pipe, a petrol pipe, a water pipe etc. All of these devices are required to pass through relatively small apertures in a casing of an assembled apparatus, e.g. an engine casing, a turbomachine casing, a gas turbine engine casing, a nuclear reactor casing, a pipe casing etc. A boroscope is used to view a component in an assembled apparatus to inspect the component. A boroscope is also used during repair of a component in an assembled apparatus to ensure that a repair of the component is carried out at the correct position on the component, e.g. to ensure that a machine tool machines at the correct position on the component, to ensure that a fluid is delivered at the correct position on the component. A machine tool is used during repair of a component in an assembled apparatus. A fluid supply is used during inspection or repair of a component in an assembled apparatus. A fluid supply may be a supply of a penetrant dye to determine if there is a crack in a surface of the component. A fluid supply may be supply of a fluid to clean the surface of the component before penetrant dye inspection, after penetrant dye inspection, before machining or after machining. The support structure of the present invention secures the boroscope, fluid supply, machine tool etc to the casing of the apparatus to provide a stable platform for the boroscope, fluid supply, machine tool etc. The support structure may pass through a bolt hole, a boroscope hole or other suitable hole in the casing. The present invention provides a support structure which has two or more, for example three, contact points within the assembled apparatus.

The method may comprise providing a plurality of support structures, inserting each support structure through a respective aperture in the casing, securing a first tool to a first support structure, securing a second tool to a second support structure, securing a third tool to a third support structure and securing a fourth tool to a fourth support structure. The method may comprise providing a plurality of support structures, inserting each support structure through a respective set of apertures in the outer compressor casing and the inner compressor casing, securing a first tool to a first support structure, securing a second tool to a second support structure, securing a third tool to a third support structure and securing a fourth tool to a fourth support structure. The method may comprise providing a plurality of support structures, inserting each support structure through a respective aperture in the casing, securing a portion of at least one support structure to a portion of at least one other support structure within the casing. The method may comprise securing a portion of each support structure to a portion of at least one other support structure within the casing. The method may comprise securing a portion of each support structure to a portion of two other support structures within the casing such that the support structures form a stiff ring within the casing. The method may comprise inserting each support structure through a respective aperture located around a boss in the casing, securing a portion of each support structure to a portion of two other support structures within the casing such that the support structures form a stiff ring within the casing. The method may comprise inserting each support structure through a separate bolt hole, and the tool may be inserted through an inspection aperture, and the bolt holes may be positioned around the inspection aperture. The support structures may support a membrane to form a sealed chamber as mentioned above.

The invention claimed is:

1. An apparatus for supporting a tool in an assembled apparatus, the apparatus comprising a support structure, the support structure having a first end, the first end of the support structure being securable to the assembled apparatus in use, the support structure comprises a central member and first and second support members pivotally mounted on the central member at first and second mounting positions, respectively, wherein the first and second mounting positions are longitudinally spaced from each other along the central member, the first and second support members having parallel axes of rotation, the first and second support members being movable between a non-deployed position in which the first and second support members extend a minimum distance from the central member and a deployed position in which the first and second support members extend a maximum distance from the central member, the central member and the first and second support members being configured such that in use the central member and the first and second support members while in their non-deployed position are insertable through an aperture in the assembled apparatus, the central member having a device to support the tool in use, the device selected from the group consisting of a magnetic member, an eye, an aperture, a hook, an adhesive, an electrostatic device, Velcro, a plug and a socket,
wherein the first end of the support structure has a flange and the flange has one or more projections or apertures to secure the apparatus in use to the assembled apparatus.

2. An apparatus as claimed in claim 1 wherein in the non-deployed position the first and second support members are located within the central member.

3. An apparatus as claimed in claim 2 wherein the central member has a first surface and a second surface facing in an opposite direction from the first surface, the first and second surfaces having first and second slots respectively, the first and second support members being movable through the first and second slots respectively.

4. An apparatus as claimed in claim 1 wherein the first and second support members are movable between the non-deployed position in which the first and second support members are substantially parallel to the central member and the deployed position in which the first and second support members are not parallel to the central member.

5. An apparatus as claimed in claim 1 wherein the central member is arranged coaxial or parallel with a central axis of the support structure.

6. An apparatus as claimed in claim 1 wherein the tool comprises at least one of a boroscope, a conduit for fluid, a conduit for a material, a light source, a grinder, a cutter, a laser, a welding torch or a spray deposition gun.

7. An apparatus as claimed in claim 1 wherein free ends of the first and second support members have grips or tensioners.

8. An apparatus as claimed in claim 1 wherein the support structure includes a second end opposite the first end, and the second end includes a rubber member or an elastomeric member.

9. An apparatus as claimed in claim 1 wherein the central member comprises a housing and at least one telescopic member extendable out of the housing.

10. An apparatus as claimed in claim 1 wherein the magnetic member, the eye, the aperture, the hook, the adhesive, the electrostatic device, the Velcro, the plug or the socket is located between the flange at the first end of the support structure and a second end of the support structure opposite the first end.

* * * * *